(12) United States Patent
Sarkar et al.

(10) Patent No.: US 8,526,336 B2
(45) Date of Patent: Sep. 3, 2013

(54) CONFERENCE RESOURCE ALLOCATION AND DYNAMIC REALLOCATION

(75) Inventors: Shantanu Sarkar, San Jose, CA (US); Ashish Chotai, Santa Clara, CA (US); Sravan Vadlakonda, Sunnyvale, CA (US); Aseem Asthana, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1311 days.

(21) Appl. No.: 11/501,562

(22) Filed: Aug. 9, 2006

(65) Prior Publication Data
US 2008/0063173 A1 Mar. 13, 2008

(51) Int. Cl.
*H04L 12/16* (2006.01)
*H04L 12/413* (2006.01)

(52) U.S. Cl.
USPC .......................................... 370/261; 370/447

(58) Field of Classification Search
None
See application file for complete search history.

(56) References Cited

U.S. PATENT DOCUMENTS

| | | | |
|---|---|---|---|
| 5,483,587 A | 1/1996 | Hogan et al. | |
| 5,600,366 A | 2/1997 | Schulman | |
| 5,673,253 A | 9/1997 | Shaffer | |
| 5,729,687 A | 3/1998 | Rothrock et al. | |
| 5,917,830 A | 6/1999 | Chen et al. | |
| 5,963,217 A | 10/1999 | Grayson et al. | |
| 6,044,081 A | 3/2000 | Bell et al. | |
| 6,141,324 A | 10/2000 | Abbott et al. | |
| 6,236,854 B1 | 5/2001 | Bradshaw | |
| 6,269,107 B1 | 7/2001 | Jong | |
| 6,275,497 B1 * | 8/2001 | Varma et al. | 370/431 |
| 6,332,153 B1 | 12/2001 | Cohen | |
| 6,501,739 B1 | 12/2002 | Cohen | |
| 6,505,169 B1 | 1/2003 | Bhagavath et al. | |
| 6,584,076 B1 * | 6/2003 | Aravamudan et al. | 370/260 |
| 6,608,820 B1 | 8/2003 | Bradshaw | |
| 6,621,515 B2 * | 9/2003 | Matthews et al. | 348/14.11 |
| 6,633,324 B2 * | 10/2003 | Stephens, Jr. | 348/14.09 |
| 6,671,262 B1 * | 12/2003 | Kung et al. | 370/260 |
| 6,675,216 B1 | 1/2004 | Quatrano et al. | |
| 6,718,553 B2 | 4/2004 | Kenworthy | |
| 6,735,572 B2 | 5/2004 | Landesmann | |
| 6,741,614 B1 * | 5/2004 | Porter et al. | 370/508 |
| 6,754,181 B1 * | 6/2004 | Elliott et al. | 370/252 |
| 6,771,644 B1 | 8/2004 | Brassil et al. | |
| 6,771,657 B1 | 8/2004 | Elstermann | |

(Continued)

FOREIGN PATENT DOCUMENTS
EP 1 553 735 A1 7/2005

*Primary Examiner* — Faruk Hamza
*Assistant Examiner* — Andrew Oh
(74) *Attorney, Agent, or Firm* — Baker Botts L.L.P.

(57) ABSTRACT

In one embodiment, a system for conducting a conference session among a group of participants includes a server for establishing communication channels over a network connected with endpoint devices of the participants. The server operates to allocate initial resources on the network to conduct the conference session, the initial resources including the communication channels and at least one conferencing bridge. Code running on the server selects one or more different resources currently available during the conference session. The one or more different resources is selected to optimize a quality of service (QoS) criteria. Execution of the code causes the server to move the conference session to the one or more different resources responsive to a triggering event. It is emphasized that this abstract is provided to comply with the rules requiring an abstract that will allow a searcher or other reader to quickly ascertain the subject matter of the technical disclosure.

20 Claims, 4 Drawing Sheets

(56) References Cited

U.S. PATENT DOCUMENTS

| | | |
|---|---|---|
| 6,775,247 B1 | 8/2004 | Shaffer et al. |
| 6,816,469 B1 | 11/2004 | Kung et al. |
| 6,865,540 B1 | 3/2005 | Faber et al. |
| 6,876,734 B1 | 4/2005 | Summers et al. |
| 6,925,068 B1 | 8/2005 | Stanwood et al. |
| 6,931,001 B2 | 8/2005 | Deng |
| 6,931,113 B2 | 8/2005 | Ortel |
| 6,937,563 B2 * | 8/2005 | Preston et al. ............... 370/230 |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,035,230 B1 * | 4/2006 | Shaffer et al. ............... 370/261 |
| RE39,135 E * | 6/2006 | Riddle ......................... 709/204 |
| 7,084,898 B1 | 8/2006 | Firestone et al. |
| 7,213,050 B1 * | 5/2007 | Shaffer et al. ............... 709/204 |
| 7,602,704 B2 * | 10/2009 | Shaffer et al. ............... 370/218 |
| 7,694,002 B2 * | 4/2010 | Vadlakonda et al. ......... 709/228 |
| 2001/0000540 A1 | 4/2001 | Cooper et al. |
| 2002/0110089 A1 * | 8/2002 | Goldshtein et al. ........... 370/252 |
| 2003/0028656 A1 * | 2/2003 | Babka ......................... 709/229 |
| 2003/0076850 A1 | 4/2003 | Jason, Jr. |
| 2003/0198195 A1 | 10/2003 | Li |
| 2003/0214933 A1 * | 11/2003 | Margon ....................... 370/342 |
| 2004/0076135 A1 * | 4/2004 | Fredriksson ................. 370/338 |
| 2004/0077338 A1 * | 4/2004 | Hsu et al. .................... 455/414.1 |
| 2004/0165710 A1 | 8/2004 | DelHoyo et al. |
| 2004/0213152 A1 | 10/2004 | Matuoka et al. |
| 2005/0069102 A1 | 3/2005 | Chang |
| 2005/0246666 A1 * | 11/2005 | Kalinoski et al. ........... 715/963 |
| 2006/0062367 A1 * | 3/2006 | Christenson et al. .... 379/202.01 |
| 2007/0150583 A1 * | 6/2007 | Asthana et al. .............. 709/224 |
| 2007/0239885 A1 * | 10/2007 | Vadlakonda et al. ......... 709/232 |
| 2007/0263824 A1 * | 11/2007 | Bangalore et al. ...... 379/202.01 |
| 2008/0160985 A1 * | 7/2008 | Variyath et al. ............ 455/422.1 |

* cited by examiner

CONFERENCE RESOURCE ALLOCATION AND DYNAMIC REALLOCATION

FIELD OF THE INVENTION

The present invention relates generally to the field of packet-based communication networks; more specifically, to apparatus and methods for conducting conferencing over a communications network.

BACKGROUND OF THE INVENTION

Conferencing systems, in which participants communicate in a conference call or meeting over existing voice and data networks, have grown increasingly complex in recent years in order to increase the number of people able to efficiently participate in a conference call. In any conferencing system, the usage of network resources is a function of the number of participants. In a traditional system, each time an end-user or object initiates a conference session to facilitate a particular call or meeting, a processor, such as a digital signal processor (DSP) associated with a multipoint control unit (MCU), sets up of media streams from the endpoints to a conference server or bridge, where the streams may be mixed and then sent back to the endpoints as individual streams. The limited resource capacity of network devices (mixers, routers, media switches, processors, etc.) coupled with the high demand for conferencing resources, means that it is essential to efficiently allocate and schedule conference call resources on a communications network.

Conference resource scheduling systems typically rely upon various usage metrics to determine the appropriate conference resource to allocate for a given conference. For example, resource usage metrics are often used to allocate a conference bridge—either in advance of a scheduled conference or on an on-demand basis for an ad hoc conference session. A common metric used to determine whether a bridge is to be allocated involves resource usage statistics in conjunction with some sort of round-robin or least-recently used (LRU) algorithm.

One of the problems with relying upon resource usage statistics when allocating conference call resources (such as a bridge) is that such statistics usually do not accurately predict the location in the network where a given user will call or join from to access or initiate a conference session. The physical location of the user in the network is important to efficient resource allocation because it can affect performance considerations such as signal latency, timing and synchronization. Optimizing performance criteria such as signal latency, timing and synchronization are important when attempting to achieve an optimal conference user experience (e.g., good audio quality). For example, if everyone participating in a conference call will be dialing into the call from a certain building, the optimal location of the bridge is at or near that building.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION OF EXAMPLE EMBODIMENTS

In the following description specific details are set forth, such as device types, system configurations, protocols, applications, methods, etc., in order to provide a thorough understanding of the present invention. However, persons having ordinary skill in the relevant arts will appreciate that these specific details may not be needed to practice the present invention.

According to one embodiment of the present invention, a mechanism is provided for improving an initial conference call resource selection or allocation by utilizing history and presence information about the users, i.e., the participants invited to the conference session. The user history information may include, for example, data such as the physical location where a particular user dialed into a conference for the last several meetings he attended. If, for instance, a user most frequently dials into a conference session from his home, that location may be used along with various resource usage metrics to select a conference bridge optimized in terms of latency, phase shift, or other quality of service (QoS) consideration.

Various decision algorithms, such as a weighted average probability calculation, may be applied to accumulated history and presence information about each participant in order to determine the highest probability location of each participant dialing into the conference session. By making a reasonably accurate predictive guess about a probable location where users will join a conference session from, an optimal resource selection may be made most of the time. A resource may be considered to be an optimal resource selection from, say, a latency point of view, if it provides the lowest average latency for all users in the conference session. Other metrics for average latency, such as lowest-mean-square (LMS), could also be used in accordance with different embodiments of the present invention. (Practitioners in the art appreciate that LMS-type algorithms provide a degree of fairness by avoiding large deviations from the mean latency.) Additionally, the mechanism described herein facilitates an increase in utilization of conference resources by eliminating the redundant processing of inactive media streams originating from each of the remaining endpoints.

In one embodiment, two kinds of user history information are relevant: conference history and presence history, both of which may be utilized when making a predictive determination of where a user will likely call from. In certain implementations, the predictor mechanism may incorporate a degree of hysteresis, or what is commonly known as a "fast-attack algorithm", to either minimize or accentuate the impact of slight changes in presence information.

Figure 1:
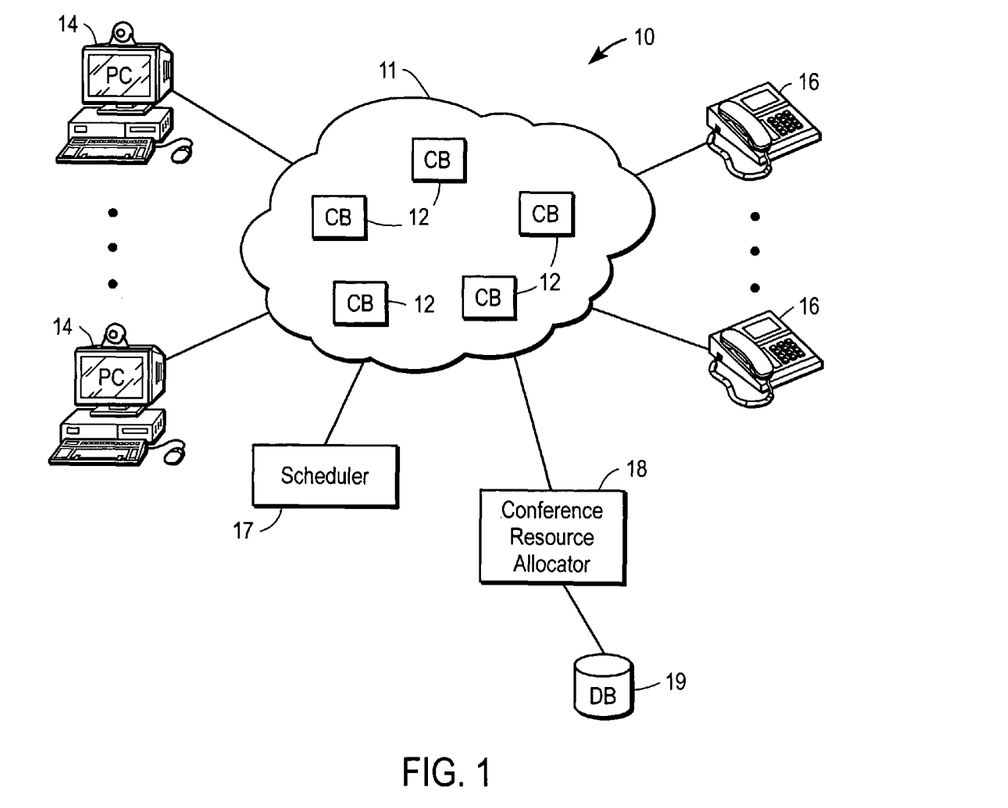
FIG. 1 illustrates an example communications network.

FIG. 1 is an example communications system 10 with endpoint devices that include VoIP phones 16 and personal computers (PCs) 14. Each of the PCs is configured with an associated video camera; that is, each PC 14 has an associated video camera 13 to facilitate participation in a video conference session. In general, an endpoint represents an end user, client, or person who wishes to initiate or participate in an audio/video conference session and via communications system 10. Other endpoint devices not specifically shown in FIG. 2 that may be used to initiate or participate in a conference session include a personal digital assistant (PDA), a laptop or notebook computer, a non-IP telephone device, a video appliance, a streaming client, a television device, or any other device, component, element, or object capable of initiating or participating in voice, video, or data exchanges with communications system 10. In operation, each of the endpoint devices shown in FIG. 1 may join an audio/video conference session by calling into a conferencing application running on a conferencing server, e.g., conferencing resource allocator 18.

FIG. 1 illustrates PCs 14 and VoIP phones 16 connected via an network 11, which includes a plurality of conferencing call resources (e.g., conference bridges) 12 distributed at different physically locations within network 11. Other types of call resources include media switches; mixers (e.g., a digital signal processor (DSP) or a firmware/software-based system to mix and/or switch audio/video signals received at its input ports), call gateway devices, etc. A scheduler 17 and conference resource allocator 18 are also shown connected with IP network 11. Additionally, conference resource allocator 18 is shown connected with a database 19.

It is appreciated that the media path for the conference participants (via the various endpoints shown) may include audio/video transmissions, e.g., Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP), H.323, session initiation protocol (SIP), media gateway control protocol (MGCP), etc.), with connections that span across multiple services, systems, and devices (e.g., private branch exchange (PBX) systems, VoIP gateways, etc.).

Scheduler 17 comprises a scheduling application, server, or any other IP communication system product, such as Cisco's MeetingPlace™ conferencing application, that allows users to schedule meeting conferences in advance or, alternatively, to set up conferences immediately by dialing out to participant parties. Cisco MeetingPlace™ is typically deployed on a corporate network behind the firewall, and facilitates scheduling of business conferences from a touch-tone or voice over IP (VOIP) telephone, or a computer, using various software clients, such as Microsoft® Outlook, or a web browser. Scheduler 17 may also comprises any of a variety of scheduling systems, such as the Calendar Facility of Microsoft® Outlook, that provide a user with the ability to propose a meeting time to one or more other users. For instance, in the Calendar Facility, the system typically checks the schedule of potential participants and sends a message to each one asking them to attend.

Continuing with the example of FIG. 1, conference resource allocator 18 comprises an application or conferencing/meeting server for establishing a scheduled conference session and for handling the control plane functions associated with the conference session. In operation, a user sets up a conference session by inviting a group of conference participants using scheduler 17. Scheduler 17 transfers this information to conference resource allocator 18, which then establishes the conference session by allocating and engaging the necessary media components/resources of communications system 10 to satisfy the media requirements of all of endpoint devices invited to attend the conference session. Conference resource allocator 18 may execute various algorithms (i.e., code) in order to make an a priori selection of conference call resources, and for dynamically changing the current allocation in response to changing network conditions, or other events that occur during the conference session, as described in more detail below.

Practitioners in the arts will understand that there exist multiple alternative ways of aggregating/disaggregating the conferencing and mixing (bridging) resources within the communication network "cloud" 11. In other words, the details of system 10 can vary greatly depending upon application, available resources, network usage, and other particular configuration considerations. In addition, it is appreciated that the scheduler 17 and conference resource allocator 18 may be integrated or incorporated into a single application or server that runs executable code to implement the conferencing or meeting functions described herein.

Alternative embodiments may be implemented in software or hardware (firmware) installed in an IP communication system, PBX, telephony, telephone, and other telecommunications systems. Similarly, the signaling path may be across any network resource that may be utilized for transmission of commands, messages, and signals for establishing, moderating, managing and controlling the conference session.

Figure 2:
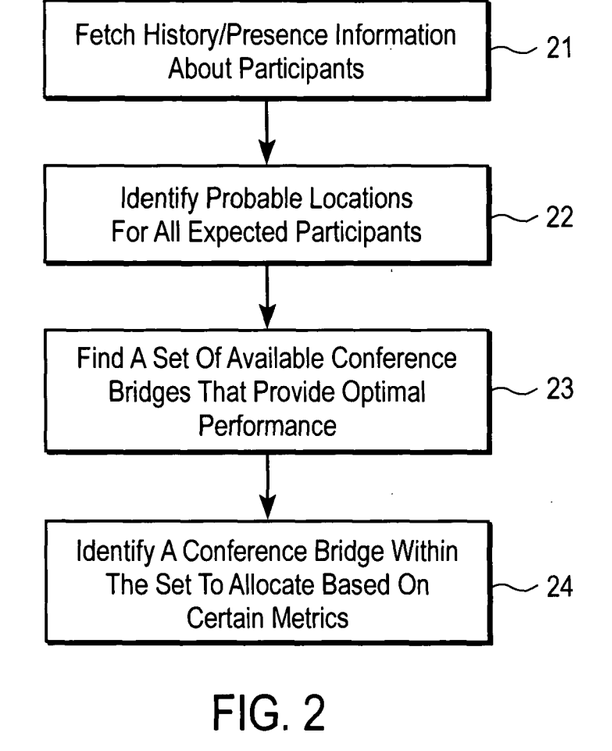
FIG. 2 illustrates an example method for conference resource allocation and dynamic reallocation.

FIG. 2 illustrates an example method for conference resource allocation and dynamic reallocation. The process starts when the conference server receives a request to establish a conference session at a particular time—either immediately or at some future date/time. In response, the conferencing server fetches history and/or presence information about the users invited to participate or expected to attend the conference session (block 21). Those who are expected to attend, for example, may include users who have affirmatively replied to an invitation message.

The history and/or presence information may be obtained, for example, by accessing a database such as database 19 shown in FIG. 1 that stores and updates user information and other network usage statistics in an archival manner. The conferencing server/scheduler may execute an algorithm aimed at making a weighted determination or guess as to the probable current physical locations where each of the users may be expected to join from (block 22). Based on that determination, the system then converges on an optimal location for a given resource type, e.g., a centrally-located mixer to all the participants with fair round-trip delays. The parameters to the algorithm may include presence information of the participants and their presence history.

In certain embodiments, a calendaring system may be integrated with the resource scheduler/allocator. Alternatively, user information such as presence information may be extracted from other applications, e.g., an email client such as Microsoft Outlook. In Microsoft Outlook, for example, calendar information may be derived via Collaboration Data Objects. Once the list of participants is available, each participant could be queried about their presence/location. History information about the location characteristics of the invited participants may then be stored in a database associated with the conferencing scheduler/allocator. The database can also keep track of participants (user-ids) who frequently attend recurring meetings.

Based on the list of probable user locations, the conferencing server proceeds to find a set of available conference bridges, and other conference call resources, which provide optimal performance in terms of QoS (block 23).

By way of example, in cases where signal latency is a primary QoS consideration, latency may be determined by transmitting packet "pings" between each of the endpoints and a particular conference bridge. Alternatively, latency and/or other performance criteria may be determined from historical Real-Time Control Protocol (RTCP) information or other historical/statistical data. Note that there may be times when all of the expected users or conference participants will not be completely known, in which case the selection of the conferencing resources may not be fully optimized at the start of the conference session. However, as described in conjunction with FIG. 4 below, in one embodiment a mechanism is provided for dynamically reallocating conference resources in response to changing network conditions or other triggering events. In other words, if an initial selection is sub-optimal due to the fact that some of the conference participants were not known before the start of the conference session, the conferencing server is operable to reallocate resources during the session based on current network conditions and the actual participants attending the meeting.

Continuing with the example of FIG. 2, once a set of conference bridges have been found that provide optimal performance (e.g., in terms of latency), one or more conference bridges are identified from among that set and allocated for the conference session using certain resource usage metrics (e.g., applying a round-robin, LRU, or some other algorithm).

Figure 3A:
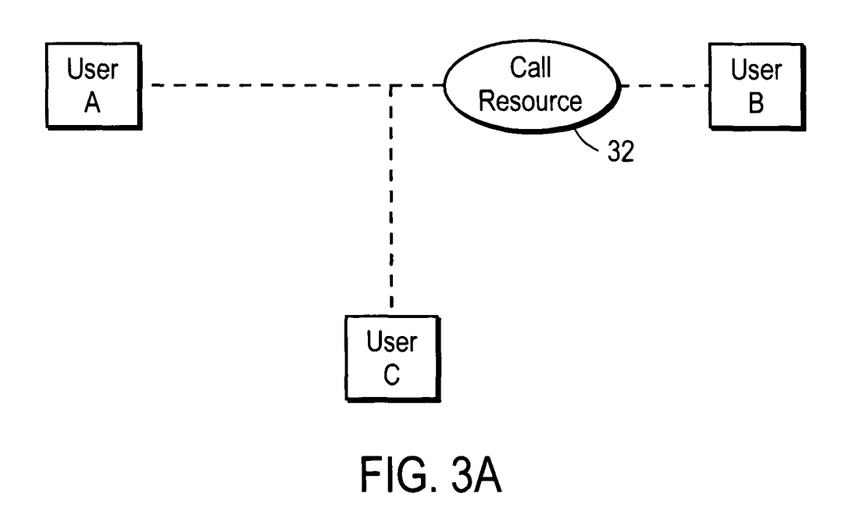
FIGS. 3A & 3B illustrate another example method for conference resource allocation and dynamic reallocation.
Figure 3B:
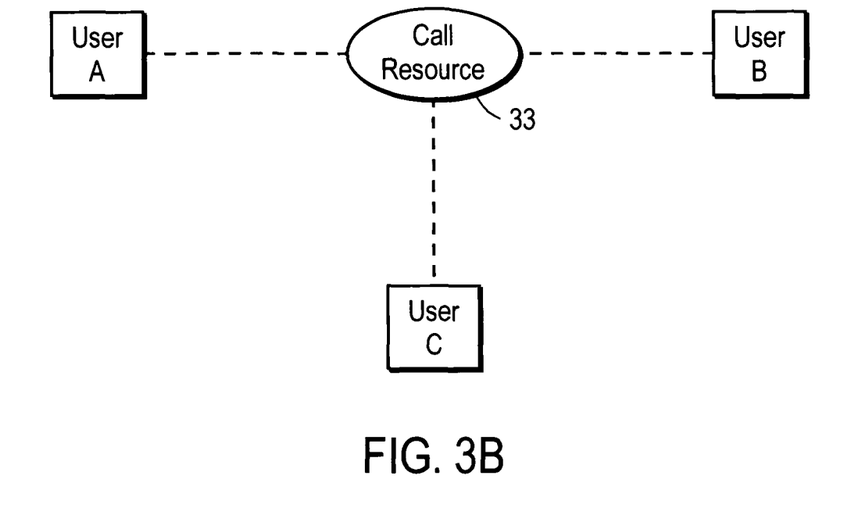

FIGS. 3A & 3B are physical network topology diagrams that illustrate another example method for conference resource allocation and dynamic reallocation. In each of FIGS. 3A & 3B, three endpoint devices—associated with users "A", "B" and "C"—are shown are located at certain physical distances from call resources 32 & 33. Each of call resources 32 & 33 may comprise an audio mixer. In FIG. 3A, for example, user "A" may have a roundtrip signal transmission time of 100 milliseconds to call resource 32. User "B's" roundtrip time may be 20 ms, while user "C" may have a roundtrip time of 40 ms. In the case of non-cascaded resources, an allocation routine executed on a conferencing resource allocator may determine the average roundtrip signal transmission time between various available call resources (e.g., call recess 32 of FIG. 3A, or call recess 33 of FIG. 3B) and each of the endpoint devices. Based on this determination, a particular call resource may be allocated that optimizes the average roundtrip signal transmission time between the resource and each of the user endpoint devices. In other words, the allocation routine may select an audio mixer such that it is equidistant (or nearly so) to all the participants in order to give all the participants an equal chance to grab a slot in the next available talk-burst.

FIG. 3B shows such an optimal call resource allocation in which each of the users is equidistant from call resource 33. This allocation ensures that the resource selected has the best a priori chance of providing a latency that is fair to all (or most) of the participants. Practitioners in the art understand that latency fairness is an important consideration since having a subset of users with high latency compared to the rest of the participants basically prevents them from being equal participants in the conference session. For instance, in the case of an allocation that results in an unbalanced latency situation, some endpoints may exhibit a phase-lag and be unable to grab a slot in the speaker selection at the end of a talk-burst. In other words, in many applications latency should be approximately equalized for all the participants, so that everyone participating in the conference session has the same physical distance to the mixer resource, and therefore enabling them to equally participate in the discussions.

Figure 4:
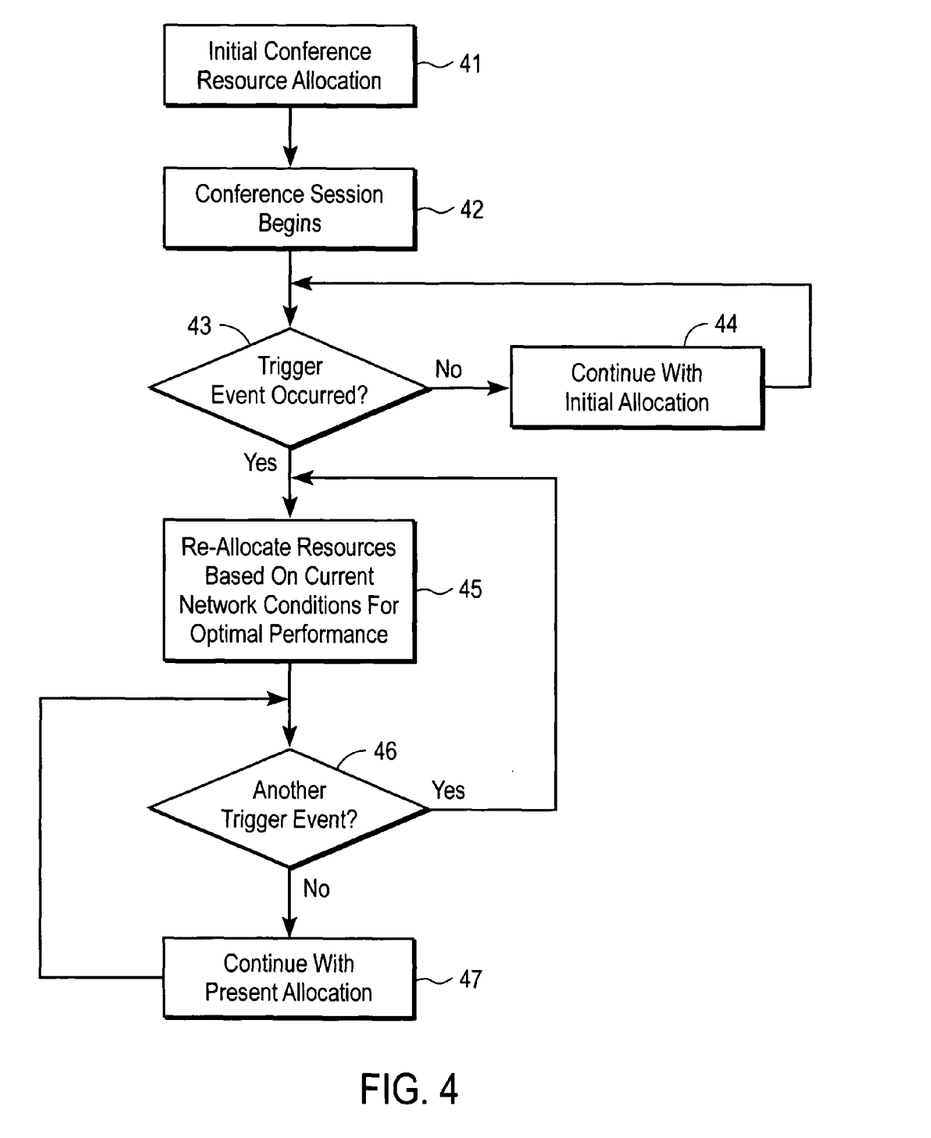
FIG. 4 illustrates another example method for conference resource allocation and dynamic reallocation.

FIG. 4 illustrates another example method for conference resource allocation and dynamic reallocation in which network conditions change (e.g., a new call resource becomes available) during a conference session. In such a case, the conference resource allocator operates to dynamically move the conference session to a new resource to achieve a more optimal resource allocation, thereby achieving improved performance. The process of FIG. 4 begins at block 41, where an initial conference resource allocation has already been made in accordance with the method described in the embodiment of FIG. 2. Once the conference session begins (block 42), any one of any number of triggering events may occur (block 43) that cause the system to reallocate resources for the conference session. In the absence of a triggering event, the conference session simply continues with the initial resource allocation (block of 44).

Examples of changing network conditions or events that may trigger a new allocation include: latency changes or any other quality of service issues that diminish or decrease conferencing system performance below a certain detectable threshold level; availability of new or different resources which may provide a more optimal conferencing solution; a user-based or moderator-based triggering mechanism wherein a user or moderator initiates a new allocation based on noticeable quality of service problems with the initial or current allocation; and detection of a subset of conference participants who are the most active speakers, i.e., doing most or all of the speaking, during a conference session. Any of these triggering events may be invoked automatically as part of an algorithm running on a conferencing server or conference resource allocator.

It is appreciated that certain embodiments may implement a feature wherein reallocation may be disabled or prohibited from occurring in situations where the conference session is nearly over. In other words, the triggering mechanism may be automatically turned off when there is, say, less than ten or fifteen minutes remaining in the conference session. In such cases it may not be worthwhile to move a conference from one resource to another resource.

Regardless of the particular triggering event or mechanism utilized to initiate a change in the initial allocation, reallocation of network resources is based upon the current network conditions—including currently available network/call resources—at the time the triggering event occurred (block 45). After a reallocation has been performed, the conferencing system waits until another triggering event occurs (block 46). If another triggering event does occur, resources are again reallocated based on the current network conditions (block 45). The process of a triggering event that causes a reallocation, followed by a new triggering event that causes another reallocation, may continue repeatedly during the conferencing session. Alternatively, in the absence of a triggering event or no new network conditions the conferencing session continues with the present allocation (block 47).

Practitioners in the art will appreciate that a variety of different implementations of the above-described methods and mechanisms are possible within the scope and spirit of the present invention. For example, in a particular implementation the conferencing server or resource allocator may periodically measure latency during the active conference session. The moment that the measured latency is significantly worse than a predicted latency or acceptable threshold level, the allocator begins searching for a better resource (e.g., bridge) available on the communications network. Note that latency may not be the only measure of audio quality that is monitored. Packet drops and other performance thresholds are other criteria or considerations that could also be used for triggering a reallocation. If a better resource is found, the conference session is moved to a new resource, provided that there is sufficient time remaining in the scheduled conference session.

It should be understood that there are numerous prior art methods of moving a conference session from one resource to another.

In a variation of the above embodiment, the conferencing server may periodically monitor all conference resources that are available to determine predicted latencies. For instance, if a conference bridge is found that is significantly better than an existing conference, and that conference bridge is currently available, the conference may be automatically moved to improve performance.

In still another implementation of the present invention, the conference moderator has the option of triggering a conference move. This can happen, for example, when the conference participants experience poor audio quality. Basically, when the moderator triggers a reallocation, the conference session is moved to one or more different call resources which may involve different communication channels/paths through the network. This process may be repeated by the moderator until an acceptable audio quality level is achieved.

In yet another embodiment of the present invention, the conferencing server/scheduler optimizes for more active participants rather than all participants. Speakers who are more active are assigned higher weights in an algorithm aimed at minimizing the average latency for the most active speakers. This approach is especially useful for large meetings or training sessions where the majority of the conversation involves a small group or subset of the meeting participants.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-implemented method comprising:
   fetching, by a system that includes a conference resource allocator, prior to a conference session starting, history and/or presence information about a set of participants to the conference session;
   predicatively determining, by the system, based on the history and/or presence information, a probable current physical call location of each of the participants; and
   selecting, by the system, from a set of available resources on a communications network, a resource having an optimal physical location for the conference session based on the probable current physical call location of each of the participants and an average roundtrip signal transmission time between the resource and each endpoint device respectively associated with each of the participants to the conference session, wherein the optimal physical location of the resource provides each of the participants with a substantially equal chance of grabbing a slot in a next available talk burst during the conference session by approximately equalizing latency among the participants.

2. The computer-implemented method of claim 1 wherein the selecting of the resource comprises calculating, by the system, the average roundtrip signal transmission time.

3. The computer-implemented method of claim 1 wherein the resource comprises a conferencing bridge.

4. The computer-implemented method of claim 1 wherein the resource comprises a mixer.

5. The computer-implemented method of claim 1 wherein fetching the history and/or presence information comprises accessing, by the conference resource allocator, a database that stores the history and/or presence information about the participants.

6. A computer-implemented method comprising:
   determining a probable current physical call location of each participant to a conference session based on history and/or presence information of the participant, the conference session including a plurality of participants;
   allocating an initial resource for the conference session from a set of available resources on a communications network, the initial resource providing an initial optimal physical location based on the probable current physical call location of each participant and an average roundtrip signal transmission time between the resource and each endpoint device respectively associated with each participant to the conference session, wherein the initial optimal physical location of the resource provides each participant with a substantially equal chance of grabbing a slot in a next available talk burst during the conference session by approximately equalizing latency among the participants; and
   during the conference session, allocating a different resource for the conference session to replace the initial resource responsive to a triggering event, the different resource providing a current optimal physical location based on a current condition of the communications network and the average roundtrip signal transmission time.

7. The computer-implemented method of claim 6 wherein the triggering event comprises an input command from a moderator of the conference session.

8. The computer-implemented method of claim 6 further comprising periodically measuring latency from an actual current physical call location of each participant with respect to one or more newly available resources, wherein the triggering event comprises an improved latency value with respect to the one or more newly available resources relative to a latency value associated with the initial resource.

9. The computer-implemented method of claim 6 wherein reallocating one of more different resources for the conference session comprises:
   identifying a set of most active participants to the conference session; and
   finding a resource that minimizes the average latency with respect to the most active participants.

10. A non-transitory computer readable medium encoded with a computer program, which, when executed by a processor, is operable to:
    initially allocate one or more resources on a communications network to facilitate a conference session among a set of participants, the initial allocation providing an initial optimal physical location of the one or more resources based on a probable current physical call location of each participant and an average roundtrip signal transmission time between the one or more resources and each endpoint device respectively associated with each participant to the conference session, wherein the initial optimal physical location of the one or more resources provides each participant with a substantially equal chance of grabbing a slot in a next available talk burst during the conference session by approximately equalizing latency among the participants; and dynamically move the conference session to one or more different resources on the communications network responsive to a triggering event, the one or more different resources providing a current optimal physical location of the one or more different resources based on a current condition of the communications network and an actual current physical call location of each participant.

11. The non-transitory computer readable medium of claim 10 wherein the triggering event comprises a quality of service issue that diminishes or decreases conferencing system performance below a certain detectable threshold level.

12. The non-transitory computer readable medium of claim 11 wherein the computer program, when executed by the processor, is further operable to periodically measure latency from the actual current physical call locations of each participant with respect to currently available resources on the communications network, and wherein the triggering event comprises an improved latency value with respect to the one or more of the currently available resources relative to a latency value associated with the one or more resources initially allocated.

13. The non-transitory computer readable medium of claim 10 wherein the current optimal physical location of the one or more different resources is further based on an average latency with respect to a subset of the participants.

14. The non-transitory computer readable medium of claim 13 wherein the subset comprises a group of most active speakers.

15. The non-transitory computer readable medium of claim 10 wherein the computer program, when executed by the processor, is further operable to determine the probable current physical call location of each participant to the conference session based on history and/or presence information of the participant.

16. The non-transitory computer readable medium of claim 15 wherein the computer program, when executed by the processor, is further operable to fetch the history and/or presence information of each participant from a database.

17. The non-transitory computer readable medium of claim 10 wherein the triggering event comprises an input command from a moderator of the conference session.

18. A system comprising:

a server for establishing communication channels over a network connected with endpoint devices of a group of participants, the server being operable to allocate initial resources on the network to conduct a conference session, the initial resources including the communication channels and at least one conferencing bridge, the initial resources having an initial optimal physical location with respect to a probable current physical call location of each participant and an average roundtrip signal transmission time between the initial resources and each endpoint device respectively associated with each participant to the conference session, wherein the initial optimal physical location of the initial resources provides each participant with a substantially equal chance of grabbing a slot in a next available talk burst during the conference session by approximately equalizing latency among the participants; and code that runs on the server to select one or more different resources currently available during the conference session, the one or more different resources being selected to provide a current optimal physical location of the one or more different resources based on an actual current physical call location of each participant and a new average roundtrip signal transmission time between the one or more different resources and each endpoint device respectively associated with each participant to the conference session, execution of the code causing the server to move the conference session to the one or more different resources responsive to a triggering event.

19. The system of claim 18 wherein the triggering event comprises an input command from a moderator of the conference session.

20. The system of claim 18 wherein the triggering event comprises a quality of service issue that diminishes or decreases conferencing system performance below a certain detectable threshold level.

* * * * *